(12) United States Patent
Song et al.

(10) Patent No.: US 9,338,232 B2
(45) Date of Patent: May 10, 2016

(54) METHOD AND SYSTEM FOR SYNCHRONIZING STATUS OF MEMBER SERVERS BELONGING TO SAME REPLICATION GROUP

(75) Inventors: Gyehan Song, Gyeonggi-do (KR); Seonghun Kim, Seoul (KR)

(73) Assignee: NHN Entertainment Corporation, Seongnam-si (KR)

(*) Notice: Subject to any disclaimer, the term of this patent is extended or adjusted under 35 U.S.C. 154(b) by 2023 days.

(21) Appl. No.: 11/915,155

(22) PCT Filed: May 25, 2006

(86) PCT No.: PCT/KR2006/001975
§ 371 (c)(1),
(2), (4) Date: Nov. 20, 2007

(87) PCT Pub. No.: WO2006/129931
PCT Pub. Date: Dec. 7, 2006

(65) Prior Publication Data
US 2008/0215760 A1  Sep. 4, 2008

(30) Foreign Application Priority Data
May 31, 2005  (KR) .................. 10-2005-0046027

(51) Int. Cl.
H04L 29/08 (2006.01)
H04W 4/02 (2009.01)
(52) U.S. Cl.
CPC ............ *H04L 67/1095* (2013.01); *H04W 4/02* (2013.01); *H04L 67/18* (2013.01)
(58) Field of Classification Search
CPC ..... H04W 4/02; H04L 67/18; H04L 67/1095; G06F 15/16
USPC ................................. 709/248, 205
See application file for complete search history.

(56) References Cited

U.S. PATENT DOCUMENTS 5,787,262 A * 7/1998 Shakib et al. ................. 709/205
7,805,407 B1 * 9/2010 Verbeke et al. ............... 707/634
(Continued)

FOREIGN PATENT DOCUMENTS

JP  2001-034518  2/2001
JP  2004-005092  1/2004
(Continued)

OTHER PUBLICATIONS

Lonnfors et al; "Presence Information Data Format Extension for Partial Presence"; Feb. 2005; Internet Engineering Task Force, SIMPLE Working Group; pp. 1-16.*

*Primary Examiner* — Ebrahim Golabbakhsh
(74) *Attorney, Agent, or Firm* — H.C. Park & Associates, PLC

(57) ABSTRACT

A system for synchronizing a state of a member server with a state of other member servers belonging to a same replication group, the system including: a server sequence storage unit storing a first server sequence; a message receiving unit receiving an external message from a service server and receiving a second state update message from a second member server belonging to the same replication group including the member server, the second state update message including a second server sequence; an external message processing unit, in response to the receiving the external message, increasing the first server sequence by a predetermined value, generating a first state update message including the first server sequence, and transmitting the first state update message to the second member server; and a state update message processing unit, in response to the receiving the second state update message, changing the first server sequence to the second server sequence when the second server sequence included in the second state update message is larger than the first server sequence stored in the server sequence storage unit.

22 Claims, 13 Drawing Sheets

(56) References Cited

U.S. PATENT DOCUMENTS

2002/0091814 A1* 7/2002 Arendt et al. .............. 709/223
2003/0177194 A1* 9/2003 Crocker et al. ............ 709/206
2006/0195532 A1* 8/2006 Zlateff et al. .............. 709/206

FOREIGN PATENT DOCUMENTS

| JP | 2005-038207 | 2/2005 |
| WO | WO 01/06364 | 1/2001 |

* cited by examiner

PRIOR ART

FIG. 4
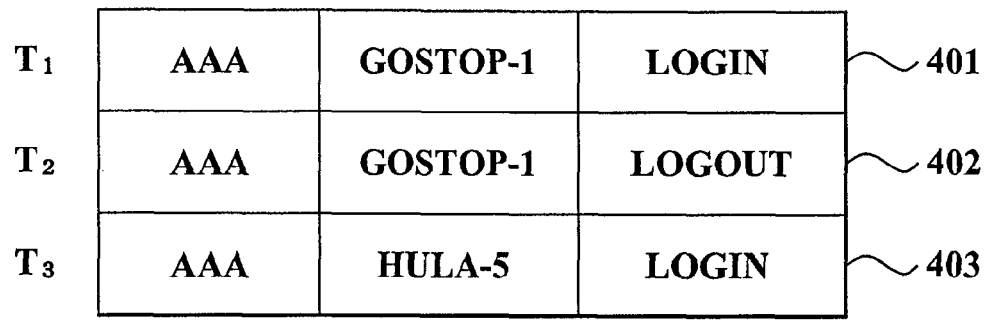
(a)
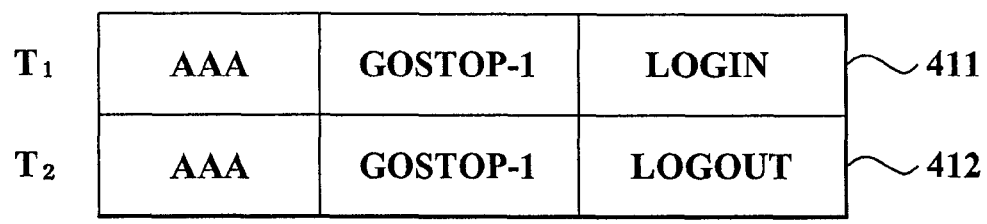
(b)
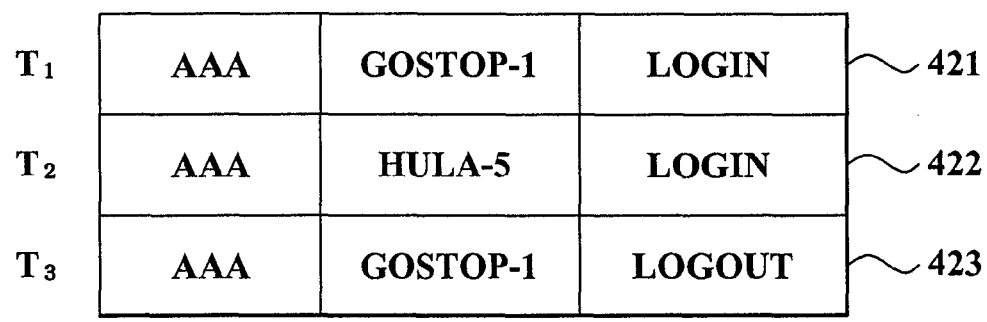
(c)

METHOD AND SYSTEM FOR SYNCHRONIZING STATUS OF MEMBER SERVERS BELONGING TO SAME REPLICATION GROUP

CROSS REFERENCE TO RELATED APPLICATIONS

This application is a U.S. National Phase Application of International Application PCT Application No. PCT/KR2006/001975 filed on May 25, 2006, which claims the benefit of priority from Korean Patent Application No. 10-2005-0046027 filed on May 31, 2005. The disclosures of International Application PCT Application No. PCT/KR2006/001975 and Korean Patent Application No. 10-2005-0046027 are incorporated herein by reference.

TECHNICAL FIELD

The present invention relates to managing user login/logout information independently managed by a plurality of service servers via an additional location server, and more particularly, to a method and system for forming a replication group formed of location servers and synchronizing a state of the location servers belonging to the replication group.

BACKGROUND ART

FIG. 1 is a diagram illustrating network connections of user terminals accessing a plurality of service server according to a conventional art.

NHN Corporation has provided a plurality of online game service such as Gostop, Hula, poker, Tetris, and chess, via NHN's own Hangame site. In FIG. 1, users using user PCs 101 and 102 access service servers 104, 105, and 106 providing an online game desired by users. For example, the service servers 104 and 105 may provide a Gostop game service, and the service server 106 may provide a Hula game service. In this case, login/logout of the user is separately performed by each of the service servers 104, 105, and 106, and login/logout information of the user is separately managed by the each of the service servers 104, 105, and 106. Accordingly, in a conventional technology, a user logged in to one service server does not know a present state of the user logged in to other service servers, for example, whether the user logs in or out or what game is being played by the user.

FIG. 2 is a diagram illustrating network connections of a location server for managing location information of users and service servers according to another conventional art.

To solve the problem of the configuration illustrated in FIG. 1, a location server 207 capable of collectively managing login/logout information of users in all service servers 204, 205, and 206 is provided. When users access service servers 204, 205, and 206 providing online games desired by users by using user PCs 201 and 202 via the Internet 203, service servers 204, 205, and 206 transmit the login/logout information of users to the location server 207. Accordingly, since the location server 207 collectively manages the login/logout information of users in service servers 204, 205, and 206, a state of users logged in to any service server may be provided to users.

However, currently, since online games provided by NHN Corporation are provided by several service servers, when managing login/logout information performed by the service servers in one location server, system loads on the location server becomes excessively heavy.

Accordingly, to alleviate the system loads concentrated on the location server, a replication group formed of location servers is provided. FIG. 3 is a diagram illustrating network connections of service servers, user terminals, and a plurality of location servers forming a replication group. The location servers belonging to the replication group must have the same state information in association with a login/logout state of a user.

However, as shown in FIG. 4, it is not guaranteed that a user login/logout message transmitted to location servers belonging to a replication group is transmitted to all location servers in the physically same sequence. FIG. 4 is a diagram illustrating messages transmitted to a plurality of location servers belonging to a replication group.

When users access service servers 304, 305, and 306 providing online games desired by users by using user PCs 301 and 302 via Internet 303, service servers 304, 305, and 306 transmit a user login/logout message to a location server 308 that is one of location servers 308, 309, 310, and 311 belonging to a replication group 307. The location server 308 receiving the user login/logout message transmits the user login/logout message to other location servers 309, 310, and 311 belonging to the replication group 307. However, it is not guaranteed that the transmitted user login/logout message is transmitted to all location servers in the same sequence.

For example, FIG. 4 illustrates messages transmitted to the location servers 308, 309, and 310 at a certain point in time. Login/logout messages 401, 402, and 403 are transmitted to the location server 308 at T1, T2, and T3, respectively. The message 401 indicates that a user AAA logs into a first channel of a game of Gostop. However, a message 411 indicating that the user AAA logs into the first channel of the Gostop game and a message 412 indicating that the user AAA logs out of the first channel of the Gostop game are transmitted to the location server 309. Also, although the location server 310 has the same number of messages as the location server 308, a sequence of the messages transmitted to the location server 308 is different from a sequence of the messages transmitted to the location server 310. Namely, the location server 308 receives the messages in a sequence of the message 401, message 402, and message 403, but the location server 310 receives the messages in a sequence of a message 421, message 422, and message 423. When the location servers 308, 309, and 310 determine a final login state of the user AAA according to the message finally received, the location server 308 determines the user AAA is logged into a fifth channel of a game of Hula, and the location server 309 and the location server 310 determine the user AAA logged out of the first channel of the Gostop game. Accordingly, present states determined by the location servers 308, 309, and 310 belonging to the replication group 307 are different from each other.

Accordingly, a method and system for enabling location servers belonging to one replication group to maintain the same state information though user login/logout messages that are transmitted to the location servers belonging to the replication group in a different sequence from each other is required.

DISCLOSURE OF INVENTION

Technical Goals

An aspect of the present invention provides a method and system for centrally managing log state information of users by receiving a login/logout message from a plurality of service servers and replicating servers managing the log state information, thereby reducing loads on the servers managing the log state information.

An aspect of the present invention also provides a method and system for receiving an external message from a plurality of service servers and processing the messages to be in the same sequence in member servers belonging to a replication group, thereby enabling the member servers to have the same state.

An aspect of the present invention also provides a method and system in which member servers belonging to one replication group may arrange received messages in the same sequence though the messages are transmitted to the member servers belonging to the replication group in different sequences from each other.

An aspect of the present invention also provides a method and system for providing login/logout state information and location information indicating what service server a certain user logs into or log out of, in an environment of providing services to users via a plurality of service servers.

An aspect of the present invention also provides a method and system for centrally managing log state information of users by receiving a login/logout message from a plurality of service servers and replicating servers managing the log state information, thereby reducing loads on the servers managing the log state information.

Technical Solutions

According to an aspect of the present invention, there is provided a system for synchronizing a state of a member server with a state of other member servers belonging to a same replication group, the system including: a server sequence storage unit storing a first server sequence; a message receiving unit receiving an external message from a service server and receiving a second state update message from a second member server belonging to the same replication group including the member server, the second state update message including a second server sequence; an external message processing unit, in response to the receiving the external message, increasing the first server sequence by a predetermined value, generating a first state update message including the first server sequence, and transmitting the first state update message to the second member server; and a state update message processing unit, in response to the receiving the second state update message, changing the first server sequence to the second server sequence when the second server sequence included in the second state update message is larger than the first server sequence stored in the server sequence storage unit. Therefore, the member servers of the present invention synchronize the member servers' own state with other member servers belonging to the same replication group.

According to another aspect of the present invention, there is provided a location server synchronization method of synchronizing a location server with other location servers belonging to a same replication group, the method including: maintaining a first server sequence in the location server; receiving a log message from a service server; increasing the first server sequence by a predetermined value and generating a state update message including the first server sequence in response to the receiving of the log message; transmitting the generated state update message to other location servers belonging to the same replication group including the location server; receiving the state update message from the other location servers belonging to the replication group including the location server, the received state update message including a second server sequence; and changing the first server sequence maintained in the location server by the second sequence included in the received state update message when the second server sequence included in the received state update message is larger than the first server sequence maintained in the location server, in response to the receiving the state update message.

According to still another aspect of the present invention, there is provided a same replication group server synchronization method of synchronizing a first member server with a second member server belonging to a same replication group, the method including: maintaining a first server sequence and a first server identifier in the first member server; receiving an external message from a service server; increasing the first server sequence by a predetermined value and generating a first state update message including the first server sequence and the first server identifier, in response to the receiving of the external message; transmitting the first state update message to the second member server; receiving a second state update message from the second member server, the second state update message including a second server sequence and a second server identifier; changing the first server sequence maintained in the first member server by the second server sequence when the second server sequence included in the second state update message is greater than the first server sequence maintained in the first member server, in response to the receiving the second state update message; and determining a sequence of the first state update message and the second state update message in a sequence of size of the first server sequence of the first state update message and the second server sequence of the second state update message.

In this case, the sequence of the first state update message and the second state update message is determined in an order of size of the first server identifier of the first state update message and the second server identifier of the second state update message when the first server sequence of the first state update message is identical with the second server sequence of the second state update message.

BRIEF DESCRIPTION OF DRAWINGS

FIG. 4 is a diagram illustrating messages transmitted to a plurality of location servers belonging to a replication group;

BEST MODE FOR CARRYING OUT THE INVENTION

Hereinafter, exemplary embodiments of the present invention will be described with reference to the attached drawings.

Figure 1:
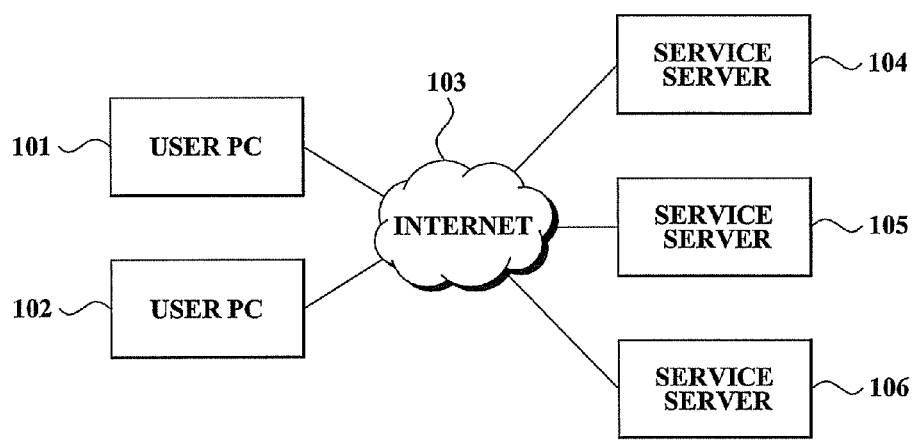
FIG. 1 is a diagram illustrating network connections of user terminals accessing a plurality of service servers according to a conventional art.
Figure 2:
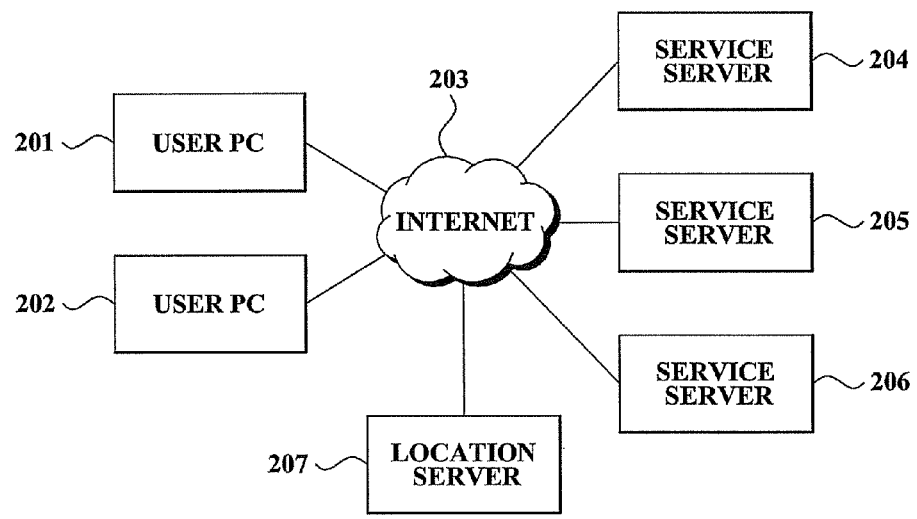
FIG. 2 is a diagram illustrating network connections of a location server for managing location information of users and service servers according to another conventional art.
Figure 3:
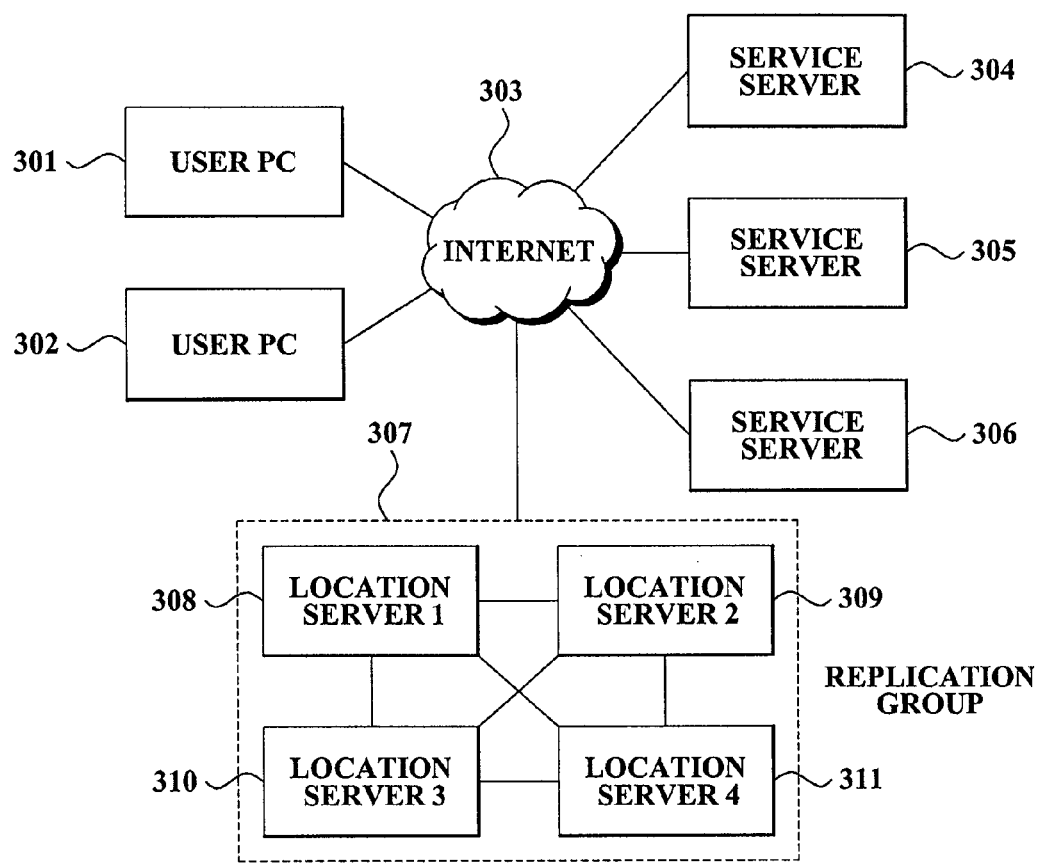
FIG. 3 is a diagram illustrating network connections of service servers, user terminals, and a plurality of location servers forming a replication group.

FIG. 3 is a diagram illustrating network connections of service servers, user terminals, and a plurality of location servers forming a replication group, according to the present invention.

When users access service servers 304, 305, and 306 providing online games desired by users by using user PCs 301 and 302 via the Internet 303, the service servers 304, 305, and 306 transmit a user login/logout message, that is an external message, to a location server 308 that is one of location servers 308, 309, 310, and 311 belonging to a location group 307.

In this case, when the service servers 304, 305, and 306 transmit an external message to all location servers instead of one location server of the location servers 308, 309, 310, and 311 belonging to the location group 307, since connections between several hundred service servers and location servers has to be managed, it becomes very difficult to synchronize a state of the location servers 308, 309, 310, and 311 belonging to the location group 307. Accordingly, in the present invention, a service server transmits an external message to one of the location servers 308, 309, 310, and 311 belonging to the location group 307.

For this, the service server may use anycast. For this, a network providing connections between the service servers 304, 305, and 306 and the location servers 308, 309, 310, and 311 has to provide anycast capability.

As another embodiment, there may be applied a method in which the location servers 308, 309, 310, and 311 belonging to the location group 307 are connected to one switch, the switch selects one of the location servers 308, 309, 310, and 311 by rolling, and external messages received from the service servers 304, 305, and 306 is transmitted to the selected location server.

As still another embodiment, addresses of all location servers 308, 309, 310, and 311 belonging to the replication group 307 are stored in each of the service servers 304, 305, and 306 and one of the location servers 308, 309, 310, and 311 is selected by rolling to receive an external message whenever the respective service server transmits the external message to one of the location servers 308, 309, 310, and 311.

The external message includes a user identifier of a user, a login/logout state of the user, and location information of the user. The user identifier is for identifying the user. For example, a user logging in to/out of the service server may use the user identifier for logging in. The login/logout state of the user is information indicating whether the user is currently logged in or logged out. The location information of the user is information indicating where the user logs in or logs out. The location information may be information on the service server where the user logs in/logs out, such as an IP address of the service server or a name of the service server, or an identifier of a service where the user logs in/logs out, such as Gostop, Hula, and Poker. When one service is provided via several channels, the location information may be a combination of the identifier of the service where the user logs in/logs out and an identifier of a channel where the user logs in/logs out. The location information provides information indicating where the user most recently logs in or logs out, in an entire service environment.

The location server 308 receiving the external message generates a state update message by processing the external message. The state update message is transmitted by the location server 308 to the other location servers 309, 310, and 311 belonging to the same location group 307. In this case, the location server 308 may transmit the state update message to the other location servers 309, 310, and 311 by multicasting. For this, a network providing connection between the location servers 308, 309, 310, and 311 has to provide multicast capability.

As yet another embodiment, addresses of the other location servers 309, 310, and 311 belonging to the location group 307 may be stored and the location server 308 receiving an external message may transmit the state update message to each of the other location servers 309, 310, and 311 by unicasting.

However, since the described external message and state update message may not be transmitted to all location servers in the same sequence, a method of arranging the messages in the same sequence in all location servers is required.

Figure 5:
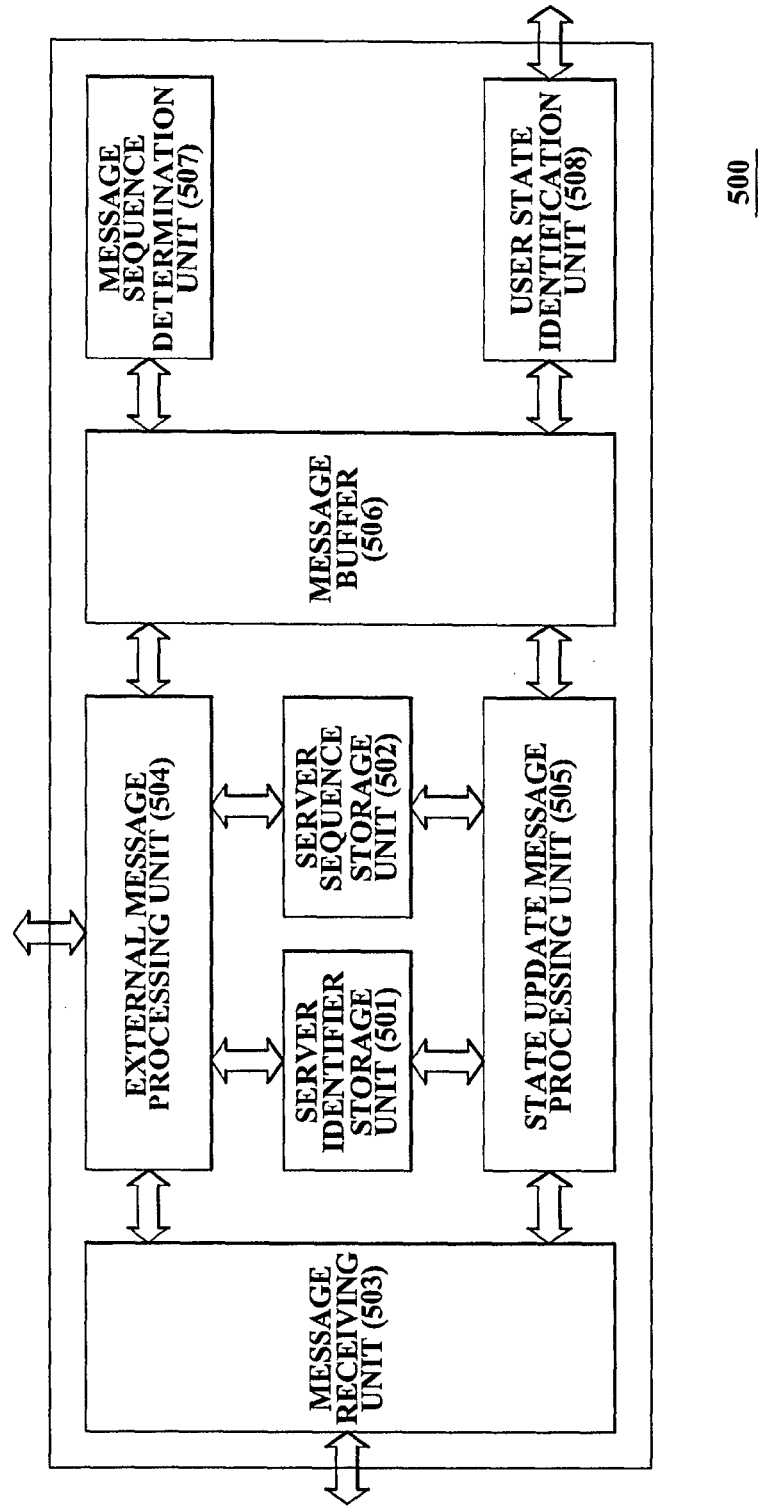
FIG. 5 is a block diagram illustrating a configuration of a member server synchronizing a state with other member servers belonging to the same replication group, according to the present invention.

FIG. 5 is a block diagram illustrating a configuration of a member server synchronizing a state with other member servers belonging to the same replication group, according to the present invention.

A member server 500 according to an embodiment of the present invention includes a server identifier storage unit 501, a server sequence storage unit 502, a message receiving unit 503, an external message processing unit 504, a state update message processing unit 505, a message buffer 506, a message sequence determination unit 507, and a user state identification unit 508. The member server 500 may be a location server managing location information of a user.

The server identifier storage unit 501 stores a server identifier capable of exclusively identifying a member server in a replication group. According to an embodiment of the present invention, a server's own IP address is used as a server identifier. The server identifier is used when a server sequence of messages stored in a message buffer is the same when determining a sequence of the messages.

The server sequence storage unit 502 stores a server sequence managed in a respective member server. When a replication group is first generated, a server sequence of all member servers belonging to the replication group is initialized as 0.

The message receiving unit 503 receives an external message from a service server. The service server may be a game server providing a game service. The external message includes a user identifier of a user, a user login/logout state indicating whether the user logs in/logs out, and location information indicating where the user logs in/logs out.

The message receiving unit 503 receives a state update message that is a second state update message, from another member server belonging to the same replication group. The state update message includes a server sequence, which is a second server sequence, stored in the other member server, in addition to a user identifier of a user, a user login/logout state indicating whether the user logs in/logs out, and location information indicating where the user logs in/logs out. According to another embodiment of the present invention, the second state update message additionally includes a server identifier stored in a server identifier storage unit of the other member server.

The external message processing unit 504 increases a first server sequence by a predetermined value such as 1 and generates and transmits a first state update message including the first server sequence to the second member server, in response to the receiving the external message. The external message processing unit 504 generates the first state update message including the first server sequence stored in the server sequence storage unit 502 in addition to the user identifier of the user, the user login/logout state, and the location information of the user. According to another embodiment of the present invention, the external message processing unit 504 generates the first state update message by additionally including the server identifier stored in the server identifier storage unit 501 of the member server 500. Also, the external message processing unit 504 stores the generated first state update message in the message buffer 506.

The state update message processing unit 505 changes and stores the first server sequence by the second server sequence in the server sequence storage unit 502 when a second server sequence included in the second state update message is greater than the first server sequence maintained in the server sequence storage unit 502, in response to the receiving the second state update message. Also, the state update message processing unit 505 stores the received second state update message in the message buffer 506. The second state update message includes the user identifier, the user login/logout state, location information of the user, and the second server sequence stored in the member server transmitting the second state update message. According to another embodiment of the present invention, the second state update message additionally includes a server identifier of the member server transmitting the second state update message.

The message sequence determination unit 507 determines a sequence of the state update messages stored in the message buffer according to a server sequence of the state update messages. Namely, the message sequence determination unit 507 determines the sequence of the first state update message and the second state update message in an order of size of the first server sequence of the first state update message and the second server sequence of the second state update message.

When the first server sequence of the first state update message is identical with the second server sequence of the second state update message, the message sequence determination unit 507 determines the sequence of the first state update message and the second state update message by using a first server identifier of the first state update message and a second server identifier of the second state update message. For example, when the server sequences of the two state update messages are identical with each other, the sequence of the first state update message and the second state update message is determined in a sequence of size of the server identifiers of the state update messages. According to the present invention, since member servers belonging to the same replication group arrange state update messages in the same sequence, the member servers may mutually synchronize their states.

The user state identification unit 508 determines a final log state of the user according to the sequence of the server sequence included in the state update message stored in the message buffer 506. Since the sequence of the state update message is determined according to the sequence of the server sequence or a combination of the server sequence and the server identifier included in the state update message stored in the message buffer 506, the user state identification unit 508 determines the final log state of each user according to a final message for each user. According to the present invention, since member servers belonging to the same replication group arrange state update messages in the same sequence, a final log state of one user, determined by the member servers belonging to the same replication group is identical to all other member servers. Namely, the member servers may have the same value with respect to whether a user currently logs in or logs out.

According to an embodiment of the present invention, the external message, the first state update message, and the second state update message include location information with respect to a channel where a user logs in/logs out. In this case, the user state identification unit 508 determines a final location of the user according to the sequence of the server sequence included in the state update message stored in the message buffer 506 or the combination of the server sequence and the server identifier. Namely, when the user logs in, what channel the user logs into is determined. According to the present invention, since the member servers belonging to the same replication group arrange the state update messages in the same sequence, the final location information with respect to the user, determined by the member servers belonging to the same replication group, becomes the same. Namely, when a user logs in, all the member servers have the same value with respect to where the user logs in.

Figure 6:
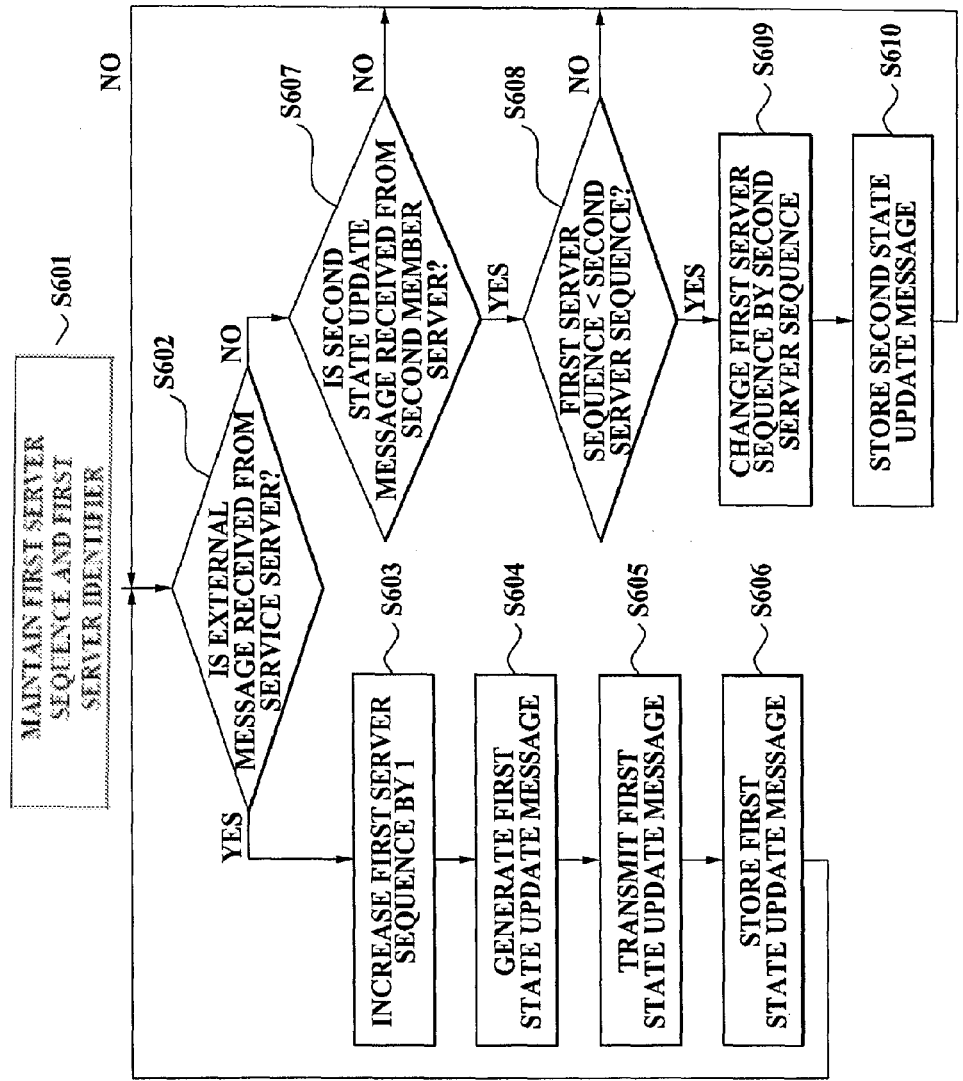
FIG. 6 is a flowchart illustrating a sequence of processing messages for synchronizing a state of member servers belonging to the same replication group, according to the present invention.

FIG. 6 is a flowchart illustrating a sequence of processing messages for synchronizing a state of member servers belonging to the same replication group, according to the present invention.

In S601, a first member server maintains a first server sequence in the server sequence storage unit 502. Also, the first member server maintains a first server identifier in the server identifier storage unit 502. In the present embodiment, the first member server and a second member server belong to the same replication group. Also, the first member server and the second member server may be location servers managing location information of a user.

In S602, the first member server determines whether an external message is received from a service server. The service server provides a service to the user via a network and, for example, may be a game server providing a game service. Also, the external message may be a log message with respect to login/logout state of the user. The log message includes a user identifier of the user, a user login/logout state with respect to whether the user logs in/logs out, and location information with respect to where the user logs in or where the user logs out.

When the external message is received from the service server in S602, in S603, the first member server increases the first server sequence by a predetermined value such as 1, in response to the receiving the external message. In the present embodiment, the server sequence is increased by 1. However, the server sequence may be increased by 2. Also, a method of decreasing by a certain amount may be employed. The described configuration is included in the scope of the present invention.

In S604, the first member server generates a first state update message including the first server sequence. The first member server generates the first state update message including the first server sequence stored in the server sequence storage unit 502 in addition to the user identifier of the user, the user login/logout state, and the location information of the user, included in the external message. According to another embodiment of the present invention, the first member server generates the first state update message additionally including a server identifier stored in the server identifier storage unit 501 of the member server.

In S605, the first member server transmits the first state update message to the second member server. In S606, the first member server stores the generated first state update message in the message buffer 506.

When the first member server does not receive the external message from the service server in S602, the first member server determines whether the first member server receives a second state update message from the second member server in S607. When the first member server does not receive the second state update message from the second member server in S607, the first member server returns to S602.

The second state update message includes a user identifier, a user login/logout state, location information of the user, and a second server sequence stored in the second member server. According to another embodiment of the present invention, the second state update message additionally includes a server identifier of the second member server. The server identifier exclusively identifies the member server from the replication group. In an embodiment of the present invention, an IP address of the member server is used as the server identifier. When a server has a plurality of IP addresses, one of the plurality of IP addresses, whose relative value is small, is selected.

In S607, when the first member server receives the second state update message from the second member server, the first member server compares the second server sequence included in the second state update message with the first server sequence maintained in the first member server in S608.

As a result of the comparison in S608, when the second server sequence included in the second state update message is greater than the first server sequence maintained in the first member server, the first member server changes the first server sequence maintained in the first member server by the second server sequence and stores the second server sequence in the server sequence storage unit 502 in S609.

In S610, the first member server stores the received second state update message in the message buffer 506. According to the present embodiment, since the member servers belonging to the same replication group arrange the state update messages in the same sequence, the member servers may mutually synchronize their states with each other.

Figure 7:
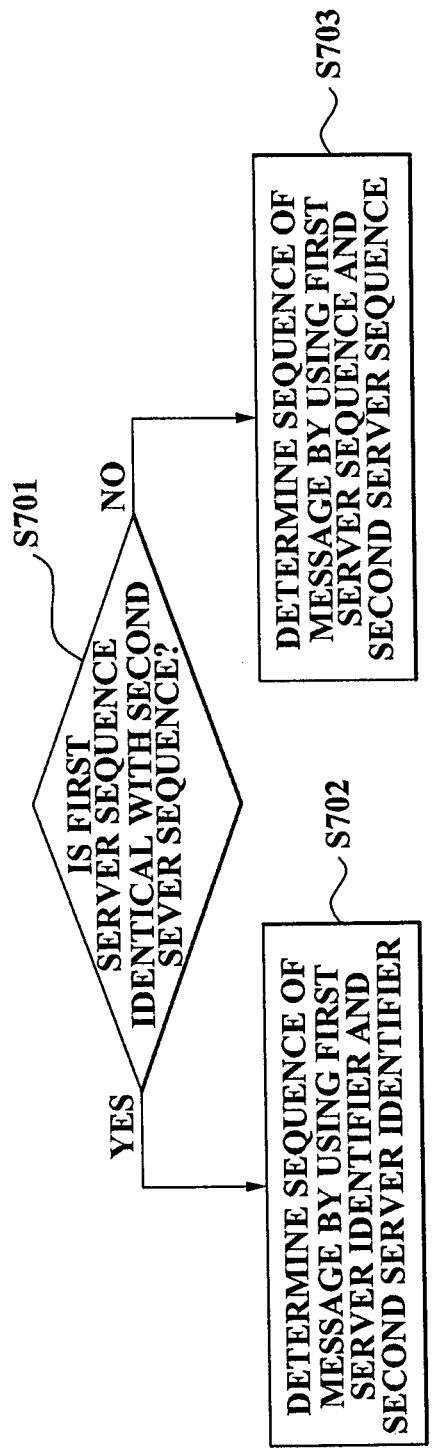
FIG. 7 is a flowchart illustrating a sequence of determining a sequence of messages stored in a member server, according to the present invention.

FIG. 7 is a flowchart illustrating a sequence of determining a sequence of messages stored in a member server, according to the present invention.

In S701, a first member server compares server sequences of state update messages stored in the message buffer 506. Namely, a first server sequence of a first state update message is compared with a second server sequence of a second state update message.

As a result of the comparison in S701, when the server sequences of the state update messages stored in the message buffer 506 are not identical with each other, the first member server determines a sequence of the state update messages according to the server sequence in S703. As a result of the comparison in S701, when the server sequences of the state update messages are identical with each other, the first member server determines the sequence of the state update messages according to server identifiers of the state update messages in S702.

Namely, when the first server sequence of the first state update message is not identical with the second server sequence of the second state update message, the first member server determines the sequence of the first state update message and the second state update message in a sequence of size of the first server sequence of the first state update message and the second server sequence of the second state update message.

When the first server sequence of the first state update message is identical with the second server sequence of the second state update message, the first member server determines the sequence of the first state update message and the second state update message in an order of size of a first server identifier of the first state update message and a second server identifier of the second state update message.

According to an embodiment of the present invention, the state update message includes a user identifier of a user, a login/logout state of the user, and location information with respect to a channel where the user logs in/logs out. Accordingly, the member servers according to the present invention determine whether the user is currently logged in or logged out, by arranging the state update messages stored in the message buffers of the member servers according to the server sequence included in the state update message or a combination of the server sequence and the server identifier. Also, referring to the location information, when the user logs in, what channel the user logs into is determined.

According to the present invention, since the member servers belonging to the same replication group arrange the state update messages in the same sequence, login/logout state information and final location information with respect to one user, determined by the member servers belonging to the same replication, becomes the same.

Figure 8:
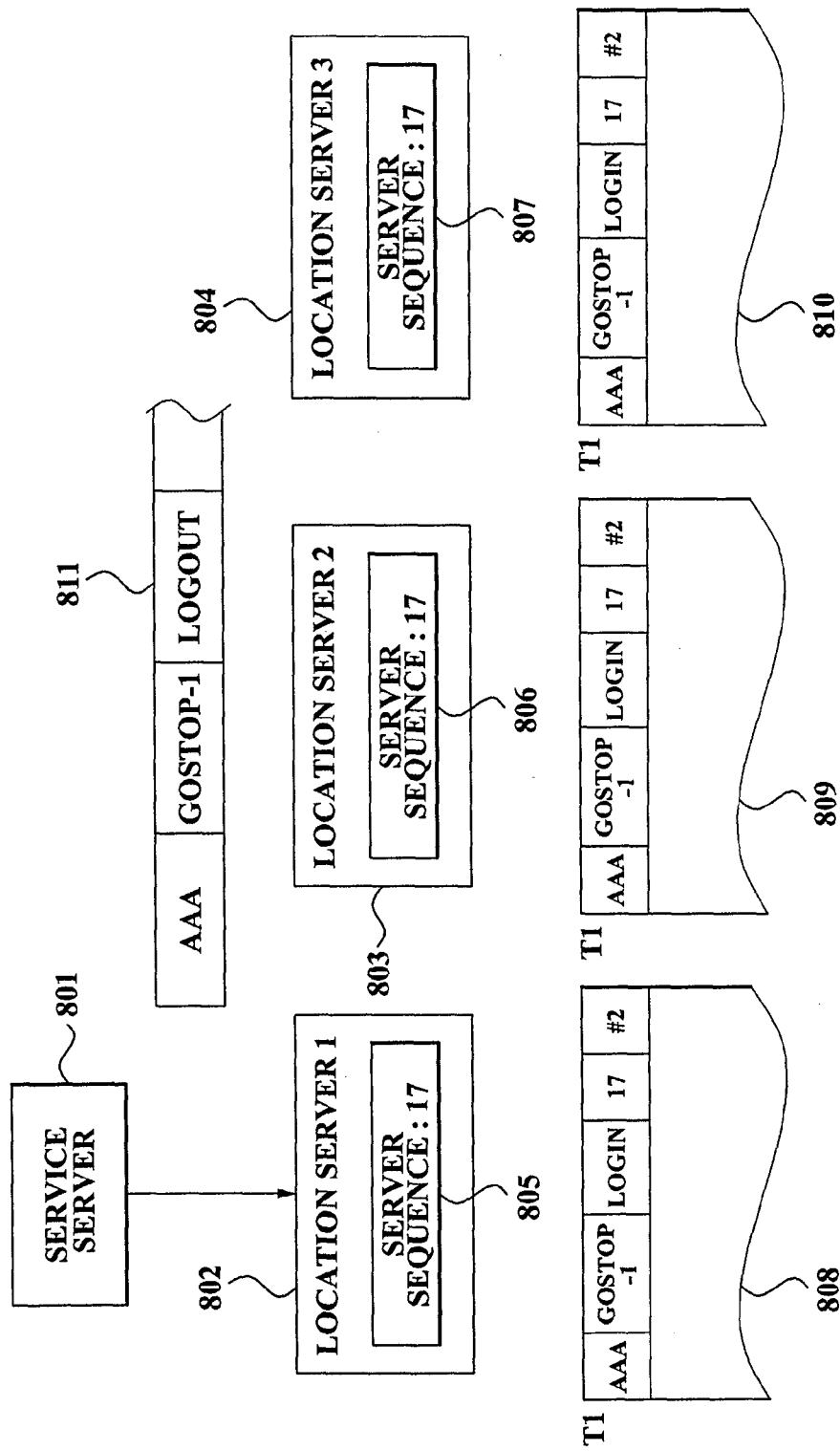
FIG. 8 is a diagram illustrating a configuration in which a service server transmits an external message to one of a number of member servers belonging to a replication group.

FIG. 8 is a diagram illustrating a configuration in which a service server transmits an external message to one of a number of member servers belonging to a replication group.

In the present embodiment, a service server 801 is a game server providing an online Gostop game service. The service server 801 provides the Gostop game service via a plurality of channels, and a user may use the game service by selecting one of the channels. A user AAA logs into the service server 801 and uses the Gostop game service via a first channel of the Gostop game. Accordingly, a message buffer 808 of a location server 1 802, a message buffer 809 of a location server 2 803, and a message buffer 810 of a location server 3 804 store a state update message indicating that the user AAA logs into the first channel of the Gostop game. "17" of the state update message is a server sequence value, and "#2" is a server identifier. Currently, a server sequence 805 of the location server 1 802, a server sequence 806 of the location server 2 803, and a server sequence 807 of the location server 3 804 have the same value of "17". According to the present invention, when multicasting one state update message is completed, the member servers belonging to the same replication group have the same server sequence value.

When the user AAA logs out of the Gostop game service via the first channel of the service server 801, the service server 801 transmits a log message 811 to one of location servers belonging to one replication group. For example, the log message 811 is transmitted to the location server 1 802.

The log message 811 includes AAA that is a user identifier of the user logging out, "Gostop-1" that is a combination of a name of the game and a number of the channel, where the user logs out, and "logout" in FIG. 8, which is login/logout information with respect to whether to log in or out.

Figure 9:
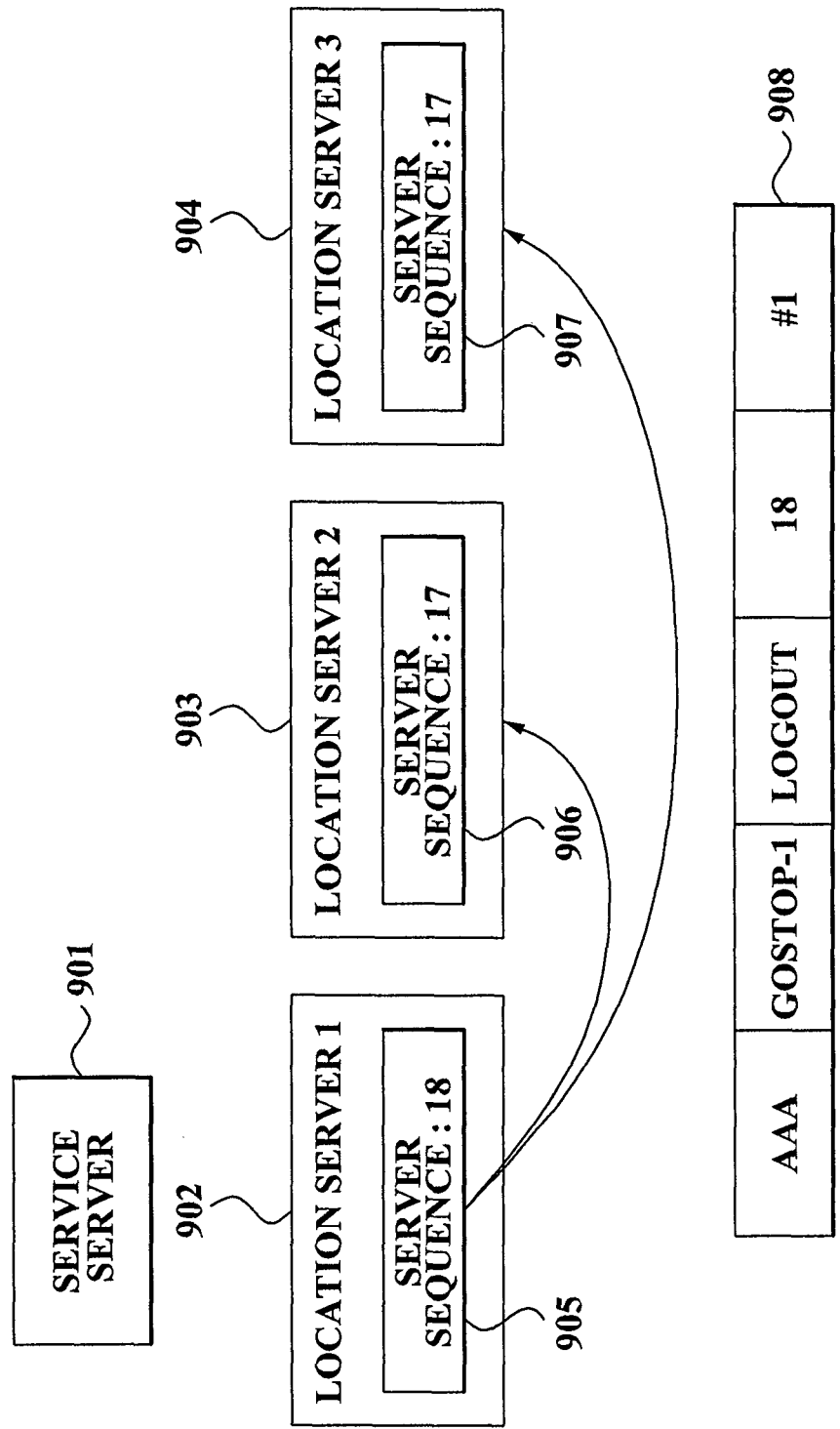
FIG. 9 is a diagram illustrating a configuration in which a member server receiving an external message from a service server transmits a state update message to other member servers belonging to the same replication group.

FIG. 9 is a diagram illustrating a configuration in which a member server receiving an external message from a service server transmits a state update message to other member servers belonging to the same replication group.

A location server 1 902 receiving the log message 811 that is an external message increases a server sequence by a predetermined value such as 1, in response to the receiving the log message. The server sequence of the location server 1 802 in FIG. 8 is 17, and the server sequence of the location server 1 902 in FIG. 9 is 18 that is made by increasing by 1. The location server 1 902 generates a state update message including the server sequence and a server identifier of the location server 1 902 in addition to the user identifier, the user login/logout state, and the location position of the user included in the log message 811. The generated state update message is shown in 908. The generated state update message 908 includes AAA that is a user identifier of the user logging out, "Gostop-1", which indicates a first channel of the Gostop game, where the user logs out, "logout" that is a login/logout state, "18" that is a server sequence, and "#1" that is a server identifier. The location server 1 902 transmits the generated state update message 908 to other location servers 903 and 904 belonging to the same replication group.

Figure 10:
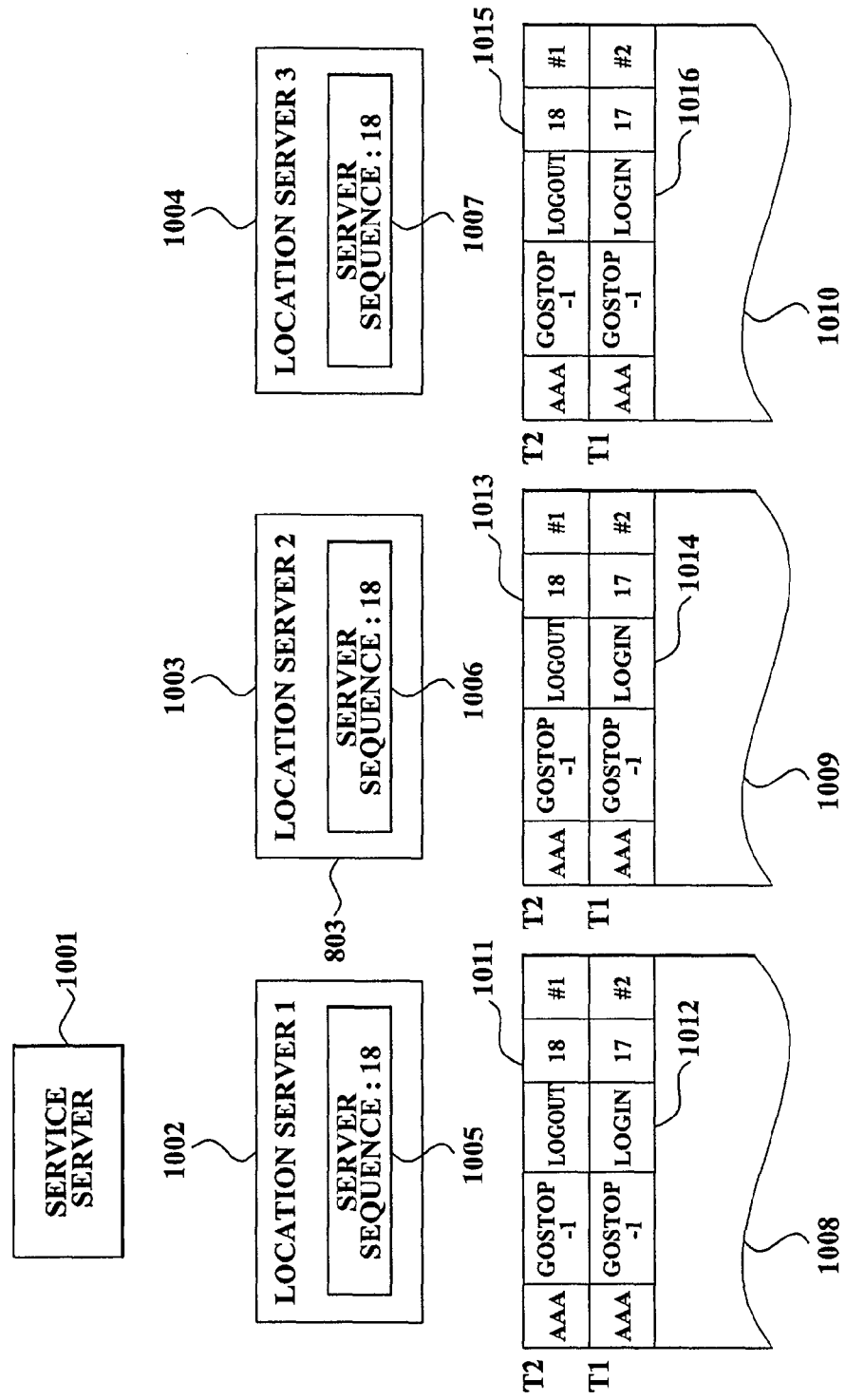
FIG. 10 is a diagram illustrating a state of a message buffer and a state of a server sequence of each of member servers after the processing messages of FIGS. 8 and 9 according to the present invention.

FIG. 10 is a diagram illustrating a state of a message buffer and a state of a server sequence of each member server after the processing messages of FIGS. 8 and 9 according to the present invention.

A location server 1 1002 receiving the state update message 908 stores the state update message 908 and 1011 in a message buffer 1008 of the location server 1 1002. In this case, a part of a format of the state update message may be processed and stored. This is included in the technical scope of the present invention.

Location servers 2 and 3 1003 and 1004 receiving the state update message 908 and 1011 compare a server sequence maintained in server sequence storage units 1006 and 1007 with a server sequence included in the state update message 908, in response to the receiving the state update message 908. As a result of the comparison, since the server sequence included in the state update message 908 is greater than the server sequence maintained in the server sequence storage units 1006 and 1007, the location servers 2 and 3 1003 and 1004 changes and updates "17" that is the server sequence maintained in the server sequence storage units 1006 and 1007 by "18" that is the server sequence included in the state update message 908.

Also, the location servers 2 and 3 1003 and 1004 stores the received state update message 908 in message buffers 1009 and 1010. In this case, a part of a format of the state update message may be processed and stored. This is included in the technical scope of the present invention.

A message sequence determination unit of the location servers 1, 2, and 3 1002, 1003, and 1004 determines a sequence of a state update message stored in a message buffer according to a server identifier of the state update message. As shown in FIG. 10, since a server sequence with a value of 17 of a message indicating that a user AAA logs into a first channel of a Gostop game is less than a server sequence with a value of 18 of a message indicating that the user AAA logs out of the first channel of the Gostop game, the messages are arranged in the same sequence in the location servers 1, 2, and 3 1002, 1003, and 1004.

As shown in FIG. 10, according to the present invention, since the location servers 1, 2, and 3 1002, 1003, and 1004 include the same state update message in the message buffer and the state update messages are arranged in the same sequence, the location servers 1, 2, and 3 1002, 1003, and 1004 have synchronized their states with each other.

Figure 11:
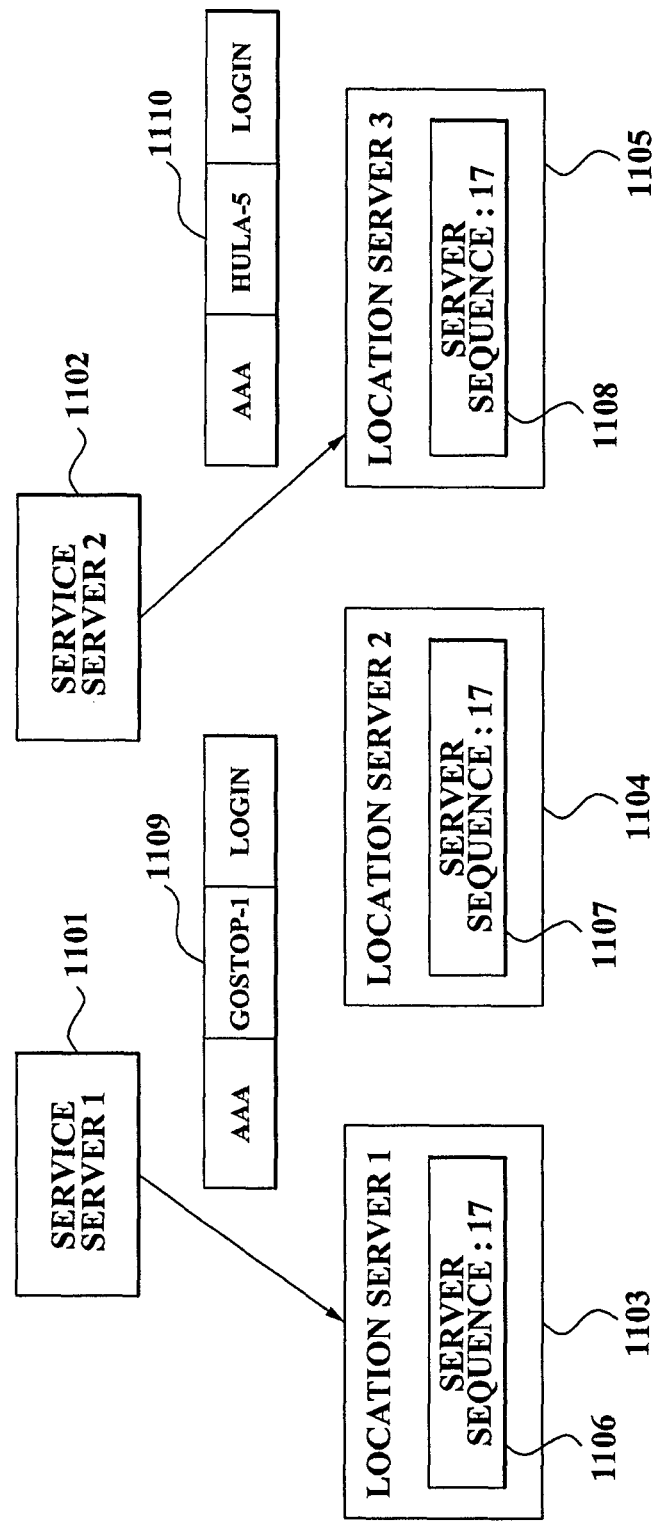
FIG. 11 is a diagram illustrating a configuration in which a plurality of service servers transmit an external message to member servers belonging to a replication group, respectively, according to the present invention.

FIG. 11 is a diagram illustrating a configuration in which a plurality of service servers transmit an external message to member servers belonging to a replication group, respectively, according to the present invention.

In FIG. 11, service servers 1 and 2 1101 and 1102 transmit log messages 1109 and 1110 to location servers 1 and 3 1103 and 1105, respectively at approximately the same point in time. The service server 1 1101 transmits the log message 1109 indicating that a user AAA logs into a first channel of a Gostop game, to the location server 1 1103. The service server 2 1102 transmits the log message 1110 indicating that the user AAA logs into a fifth channel of a Hula game, to the location server 3 1105. Currently, the location servers 1103, 1104, and 1105 have the same server sequence value.

Figure 12:
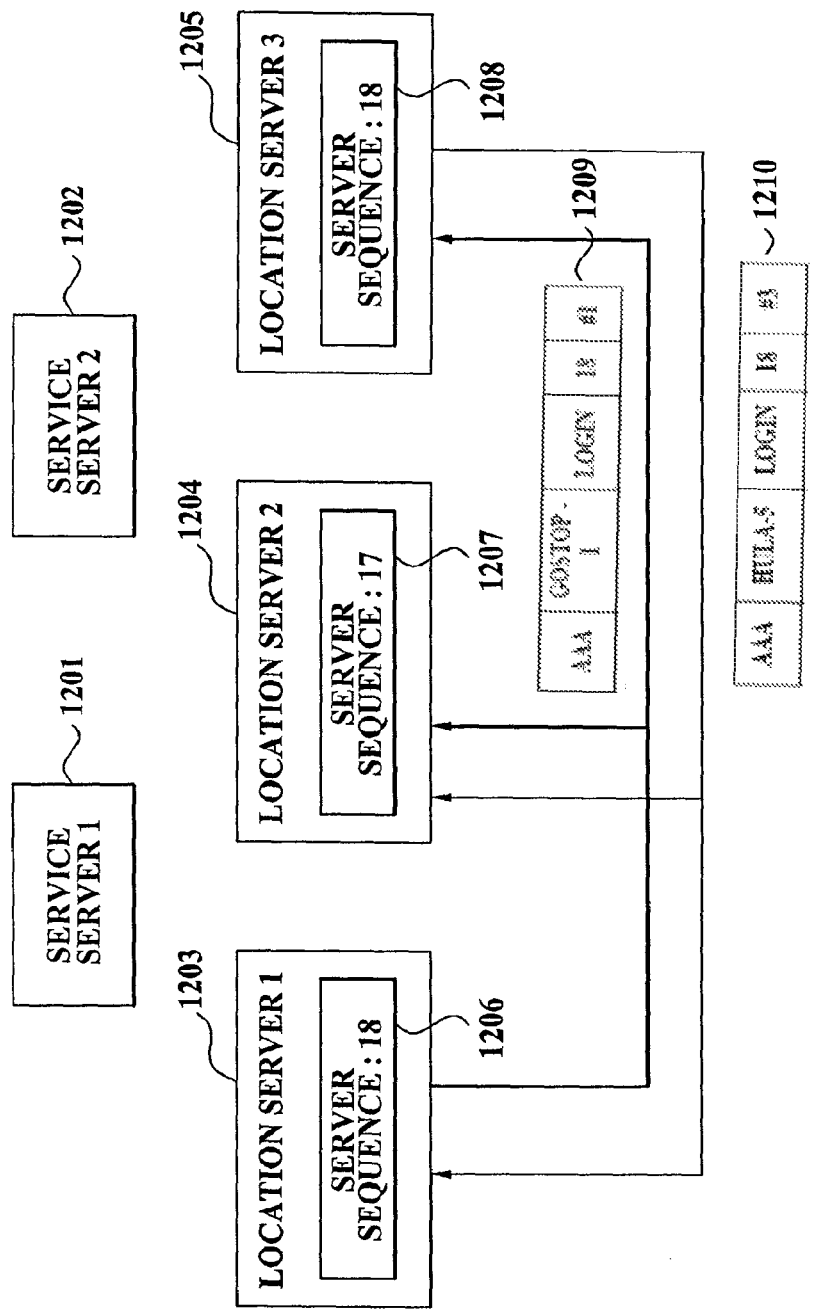
FIG. 12 is a diagram illustrating a configuration in which a member server receiving an external message from a service server transmits a state update message to other member servers belonging to the same replication group.

FIG. 12 is a diagram illustrating a configuration in which a member server receiving an external message from a service server transmits a state update message to other member servers belonging to the same replication group.

Location servers 1 and 3 1203 and 1205 receiving the log messages 1209 and 1210 increase their server sequences 1206 and 1208 by 1, respectively, generates and stores state update messages 1209 and 1210 in their message buffers, and transmit the state update messages 1209 and 1210 to other location servers belonging to the same replication group. In this case, the state update messages 1209 and 1210 include a server identifier in addition to a server sequence value. In the present embodiment, a server identifier of the location server 1 1203 is "#1", and a server identifier of the location server 3 1205 is "#3".

In FIG. 12, the server sequences 1206 and 1208 of the location servers 1 and 3 1203 and 1205 receiving the state update messages 1209 and 1210 are increased by 1 and have 18, and a location server 2 1204 maintains 17 as shown in FIG. 12.

Figure 13:
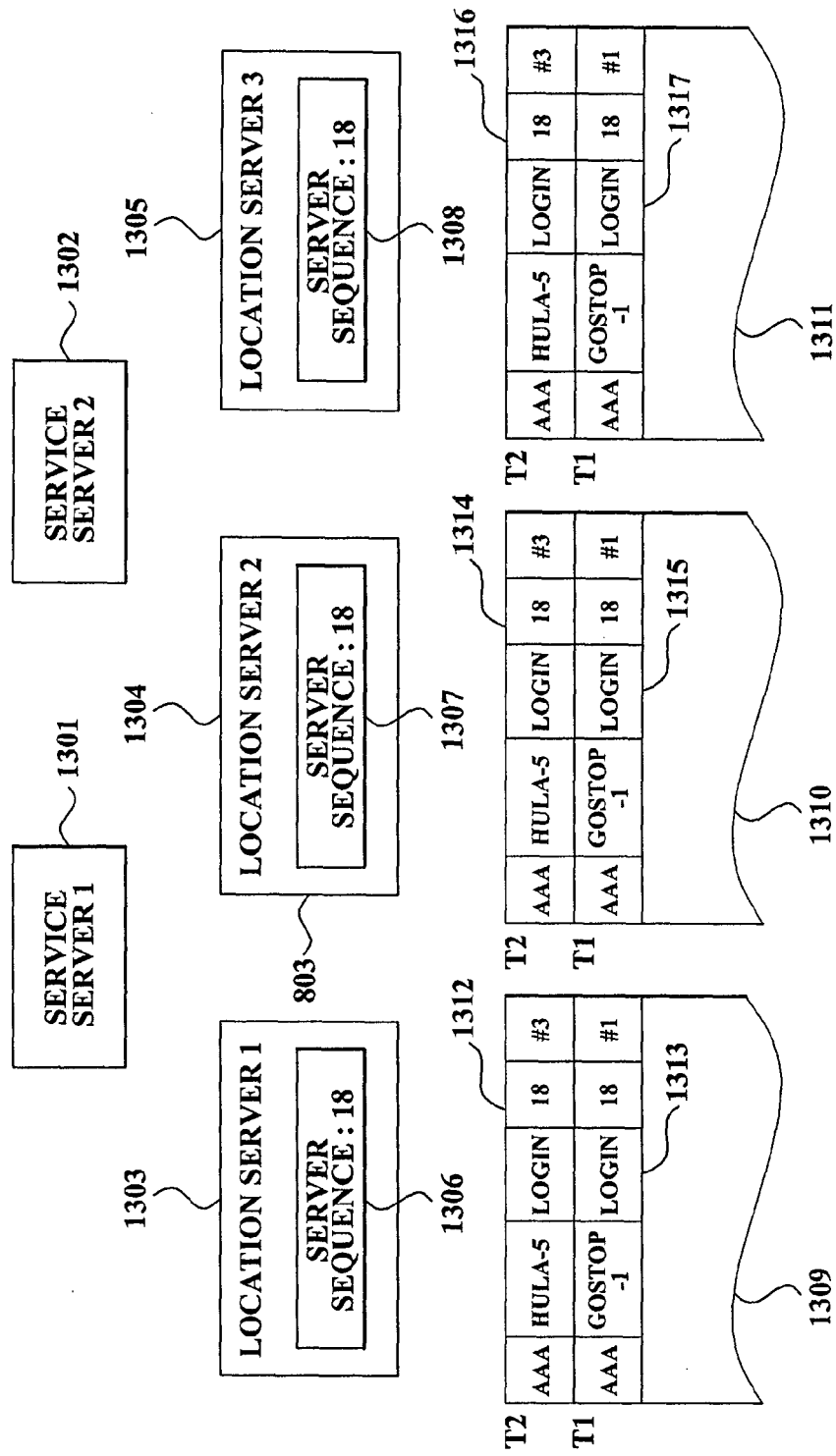
FIG. 13 is a diagram illustrating a state of a message buffer and a state of a server sequence of each of member servers after the processing messages of FIGS. 11 and 12 according to the present invention.

FIG. 13 is a diagram illustrating a state of a message buffer and a state of a server sequence of each of member servers after the processing messages of FIGS. 11 and 12 according to the present invention.

In FIG. 13, a state of server sequences and message buffers after processing all the messages is shown, regardless of which the location server 2 1204 first receives, from the state update messages 1209 and 1210.

For example, when the location server 2 1204 receives the state update message 1209 first and receives the state update message 1209 will be described. The location server 2 1204 compares the server sequence value 18 of the state update message 1209 with the server sequence value 17 of its own. Since the server sequence value 18 of the state update message 1209 is greater than the server sequence value 17 of its own, the location server 2 1204 changes its own server sequence value with the server sequence value 18 of the state update message 1209. Accordingly, a server sequence storage unit 1307 of the location server 2 1204 may maintain the server sequence value 18. The location server 2 1204 stores the received state update message 1209 in a message buffer 1310.

A location server 2 1304 receives the state update message 1210. Since the server sequence value 18 of the state update message 1210 is identical with the location server's 2 1304 own server sequence value 18, the server sequence value of the location server's 2 1304 is not changed and the received state update message 1210 is stored in the message buffer 1310.

Finally, the location server 2 1304 becomes a state as shown in FIG. 13. When the location server 2 1304 receives the state update message 1210 first and subsequently receives the state update message 1209, the same result is generated.

A location server 1 1303 compares the server sequence value 18 of the state update message received from a location server 3 1305 with a server sequence value 18 of the location server 1 1303. As a result of the comparison, since the server sequence value 18 of the state update message 1210 is identical with the server sequence value 18 of the location server 1 1303, the server sequence value 18 of its own is not changed and the received stat update message 1210 is stored in a message buffer 1309.

A location server 3 1305 also receives the state update message from the location server 1 1303, does not change a server sequence value of its own, and stores the received state update message in a message buffer 1311.

In FIG. 13, since state update messages 1312 and 1313 stored in the message buffer 1309 of the location server 1 1303 have the same sequence value, the state update messages 1312 and 1313 are arranged according to server identifiers. Similarly, since state update messages are arranged according to server identifiers in the location servers 2 and 3 1304 and 1305, the location servers 1, 2, and 3 1303, 1304, and 1305 arrange messages in the same sequence.

Also, the embodiments of the present invention include a computer-readable medium including a program instruction for executing various operations realized by a computer. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of this invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

An aspect of the present invention provides a method and system for centrally managing log state information of users by receiving a login/logout message from a plurality of service servers and replicating servers managing the log state information, thereby reducing loads on the servers managing the log state information.

An aspect of the present invention also provides a method and system for receiving an external message from a plurality of service servers and processing the messages to be in the same sequence in member servers belonging to a replication group, thereby enabling the member servers to have the same state.

An aspect of the present invention also provides a method and system in which member servers belonging to one replication group may arrange received messages in the same sequence though the messages are transmitted to the member servers belonging to the replication group in different sequences from each other.

An aspect of the present invention also provides a method and system for providing login/logout state information and location information indicating what service server a certain user logs into or log out of, in an environment of providing services to users via a plurality of service servers.

An aspect of the present invention also provides a method and system for centrally managing log state information of users by receiving a login/logout message from a plurality of service servers and replicating servers managing the log state information, thereby reducing loads on the servers managing the log state information.

What is claimed is:

1. A system for synchronizing a state of a member server with a state of other member servers in a same replication group, the system comprising:
   a server sequence storage unit configured to store a first server sequence of a first member server in a replication group, wherein the first server sequence is a sequence used to process state update messages for synchronizing the state of member servers in the replication group;
   a transceiver configured to receive an external message from a service server and to receive a second state update message from a second member server in the replication group including the first member server, the second state update message comprising a second server sequence, wherein the external message contains login or logout information of a user;
   an external message processing unit configured, in response to receipt of the external message, to update the first server sequence by a predetermined value, to generate a first state update message comprising the first server sequence, and to transmit the first state update message to the second member server; and
   a state update message processing unit configured, in response to receipt of the second state update message, to update the first server sequence with the second server sequence when the sequence value of the second server sequence included in the second state update message is larger than the first server sequence stored in the server sequence storage unit,
   wherein the service server is external to the replication group and is in a group comprising a plurality of service servers that does not comprise a member server.

2. The system of claim 1, further comprising:
   a message sequence determination unit configured to determine a sequence of the first state update message and the second state update message in accordance with the sequence values of the first server sequence of the first state update message and the second server sequence of the second update message.

3. The system of claim 1, wherein:
the external message processing unit stores the first state update message in a memory; and
the state update message processing unit stores the second state update message in the memory.

4. The system of claim 1, wherein:
the external message comprises a user identifier of the user and a login or logout state of the user;
the external message processing unit, in response to receipt of the external message, updates the first server sequence by a predetermined value, generates the first state update message comprising the first server sequence, a user identifier of the external message, and a login or logout state of the user of the external message, and transmits the first state update message to the second member server.

5. The system of claim 4, wherein the second state update message comprises the user identifier of the user and the login or logout state of the user, further comprising:
a message buffer to store the first state update message and the second state update message; and
a user state identification unit configured to determine a final log state of the user according to a sequence of the server sequence included in the state update message stored in the message buffer.

6. The system of claim 5, wherein:
the external message, the first state update message, and the second state update message comprise location information with respect to a channel through which the user logs into and logs out; and
the user state identification unit determines a final location of the user according to the sequence of the server sequence included in the state update message stored in the message buffer.

7. The system of claim 1, wherein:
the external message processing unit sends the first state update message comprising a first server identifier to identify the first member server to the second member server;
the second state update message comprises a second server identifier for identifying the second member server; and
the message sequence determination unit, when the first server sequence of the first state update message is identical with the second server sequence of the second state update message, determines a sequence of the first state update message and the second state update message by using the first server identifier of the first state update message and the second server identifier of the second state update message.

8. The system of claim 1, wherein the first sequence comprises a predefined initial sequence value.

9. A method of synchronizing location servers in a replication group, the method comprising:
maintaining a first server sequence in a first location server, wherein the first server sequence is a sequence used to process state update messages for synchronizing a state of the location servers in the replication group;
receiving a log message from a service server, wherein the log message comprises login or logout information of a user;
upon receiving the log message, updating the first server sequence by a predetermined value and generating a state update message wherein the state update message comprises the first server sequence;
transmitting the generated state update message to other location servers in the replication group including the first location server;
receiving a state update message from a second location server in said replication group, the received state update message comprising a second server sequence of the second location server; and
updating the first server sequence maintained in the first location server with the second sequence included in the received state update message when the sequence value of the second server sequence included in the received state update message is larger than the first server sequence maintained in the first location server,
wherein the service server is external to the replication group and is in a croup comprising a plurality of service servers that does not comprise a member server.

10. The method of claim 9, further comprising storing the generated state update message in a message buffer.

11. The method of claim 9, further comprising storing the received state update message from the second location server in a message buffer.

12. The method of claim 9, further comprising determining a sequence of the state update messages in accordance with the server sequences included in the respective state update messages.

13. The method of claim 9, wherein the first sequence comprises a predefined initial sequence value.

14. The method of claim 9, wherein each of the state update messages comprises a user identifier of a user and a login or logout state of the user.

15. The method of claim 14, further comprising determining a final log state of the user based upon the state update message determined to include the larger server sequence.

16. The method of claim 9, wherein:
a first server identifier is maintained in the first location server; and
generating the state update message comprises generating the first server sequence, the state update message including the first server sequence and the first server identifier;
the state update message received from the second location server comprises a second server sequence and a second server identifier; and
when the server sequences included in the respective state update messages are identical, the sequence of the state update messages is determined by using the respective server identifiers included in the state update messages.

17. The method of claim 16, wherein the first server identifier comprises an IP address of the first location server and the second server identifier comprises an IP address of the second location server.

18. A method of synchronizing a first member server with a second member server in a replication group, the method comprising:
maintaining a first server sequence and a first server identifier in a first member server, wherein the first server sequence is a sequence used to process state update messages for synchronizing a state of member servers in the replication group;
receiving an external message from a service server, wherein the external message comprises login or logout information of a user;
upon receipt of the external message, updating the first server sequence by a predetermined value and generating a first state update message comprising the first server sequence and the first server identifier;
transmitting the first state update message to a second member server;

receiving a second state update message from the second member server, the second state update message comprising a second server sequence and a second server identifier;

upon receipt of the second state update message, updating the first server sequence maintained in the first member server with the second server sequence when the second server sequence included in the second state update message is greater than the first server sequence maintained in the first member server; and determining a sequence of the first state update message and the second state update message in accordance with the value of the first server sequence of the first state update message and the value of the second server sequence of the second state update message, wherein the first and second service servers are external to the replication group and are in a group a plurality of service servers that does not comprise a member server.

19. The method of claim 18, further comprising determining the sequence of the first state update message and the second state update message in accordance with the value of the first server identifier of the first state update message and the value of the second server identifier of the second state update message when the first server sequence of the first state update message and the second server sequence of the second state update message have the same sequence value.

20. The method of claim 18, further comprising determining a final log state of the user by storing the first state update message and the second state update message in a message buffer and processing the messages according to the determined sequence of the first state update message and the second state update message, wherein the first state update message and the second state update message comprise a user identifier of a user, a login or logout state of the user, and location information associated with a channel in which the user logs into or out of.

21. A non-transitory computer-readable recording medium in which a program for executing the method recited in claim 9 is recorded.

22. A method of synchronizing a first location server with a second location server in a group wherein the location servers manage log status of a plurality of service servers, the method comprising:

maintaining a first server sequence comprising a value, wherein the first server sequence is a sequence used to process state update messages for synchronizing a state of location servers in the group;

receiving an external message from a first service server by the first location server wherein the external message comprises login or logout information of a user;

upon receipt of the external message, updating the first server sequence by a predetermined value;

generating a first state update message for the first location server wherein the first state update message comprises the updated first server sequence and the user log status of the first service server contained in the received external message;

transmitting the first state update message to a second location server;

receiving a second state update message from the second location server wherein the second state update message comprises a second server sequence and log in or logout information of the user of a second service server; and upon receipt of the second state update message, updating the first server sequence maintained in the first location server with the second server sequence in accordance with the greater of the first server sequence maintained in the first location server and the second server sequence included in the received second state update message, wherein the first and second service servers are external to the replication group and are in a group a plurality of service servers that does not comprise a member server.

* * * * *